United States Patent
Althöfer

(10) Patent No.: US 8,066,787 B2
(45) Date of Patent: Nov. 29, 2011

(54) BYPASS FLOW FILTER WITH IMPROVED FILTER EFFICIENCY AND EXHAUST SYSTEM AND VEHICLE HAVING THE FILTER

(75) Inventor: Kait Althöfer, Wiehl (DE)

(73) Assignees: EMITEC Gesellschaft fuer Emissionstechnologies mbH, Lohmar (DE); Toyota Motor Corporation, Aichi (JP)

( * ) Notice: Subject to any disclaimer, the term of this patent is extended or adjusted under 35 U.S.C. 154(b) by 422 days.

(21) Appl. No.: 12/326,417

(22) Filed: Dec. 2, 2008

(65) Prior Publication Data
US 2009/0139190 A1 Jun. 4, 2009

Related U.S. Application Data

(63) Continuation of application No. PCT/EP2007/004862, filed on Jun. 1, 2007.

(30) Foreign Application Priority Data

Jun. 2, 2006 (DE) .......................... 10 2006 026 324

(51) Int. Cl.
*B01D 46/00* (2006.01)
(52) U.S. Cl. ............. 55/321; 55/385.3; 55/309; 55/523; 55/DIG. 30
(58) Field of Classification Search .................. 55/385.3, 55/498, 522, 523, 525, DIG. 30; 422/171, 422/177, 179, 180; 423/213.2; 427/256; 502/325, 339
See application file for complete search history.

(56) References Cited

U.S. PATENT DOCUMENTS

| 7,055,314 | B2 | 6/2006 | Treiber | |
|---|---|---|---|---|
| 2004/0013580 | A1* | 1/2004 | Bruck et al. | 422/171 |
| 2005/0232830 | A1* | 10/2005 | Bruck | 422/180 |
| 2006/0257297 | A1* | 11/2006 | Bruck et al. | 422/177 |
| 2007/0041881 | A1* | 2/2007 | Voss et al. | 422/177 |
| 2007/0289276 | A1 | 12/2007 | Hirth et al. | |
| 2008/0159923 | A1 | 7/2008 | Sarai et al. | |
| 2009/0104089 | A1* | 4/2009 | Hirth et al. | 422/177 |
| 2010/0189616 | A1* | 7/2010 | Hodgson et al. | 423/213.2 |

FOREIGN PATENT DOCUMENTS

| DE | 89 08 738.0 | U1 | 9/1989 |
|---|---|---|---|
| DE | 201 17 659 | U1 | 1/2002 |
| DE | 201 17 873 | U1 | 2/2002 |
| DE | 102 24 997 | A1 | 7/2003 |
| WO | 2005/099867 | A1 | 10/2005 |
| WO | 2006/072606 | A2 | 7/2006 |

OTHER PUBLICATIONS

International Search Report, dated Sep. 3, 2007.

* cited by examiner

*Primary Examiner* — Duane Smith
*Assistant Examiner* — Minh-Chau Pham
(74) *Attorney, Agent, or Firm* — Laurence A. Greenberg; Werner H. Stemer; Ralph E. Locher

(57) ABSTRACT

A bypass flow filter includes a plurality of channels which are formed of at least one structured wall layer and a filter layer. Projecting guide vanes and passages, which are formed by the wall layer and lead to a different channel, are provided in at least a majority of the channels. The passages have a narrowing cross section and a narrowing part of the cross section is directed towards an adjacent guide vane. An exhaust system and a vehicle having a bypass flow filter, are also provided.

12 Claims, 3 Drawing Sheets

BYPASS FLOW FILTER WITH IMPROVED FILTER EFFICIENCY AND EXHAUST SYSTEM AND VEHICLE HAVING THE FILTER

CROSS-REFERENCE TO RELATED APPLICATIONS

This is a continuation, under 35 U.S.C. §120, of copending International Application No. PCT/EP2007/004862, filed Jun. 1, 2007, which designated the United States; this application also claims the priority, under 35 U.S.C. §119, of German Patent Application DE 10 2006 026 324.3, filed Jun. 2, 2006; the prior applications are herewith incorporated by reference in their entirety.

BACKGROUND OF THE INVENTION

Field of the Invention

The present invention relates to a bypass flow filter which has a plurality of channels that are formed by at least one structured wall layer and a filter layer. The bypass flow filter, as is known, is distinct from a filter which has channels that are completely closed on alternate sides. A particular field of use for such a bypass flow filter is exhaust gas aftertreatment in motor vehicles. Accordingly, the invention also relates to an exhaust system and a vehicle having the filter.

A bypass flow filter is disclosed, for example, in German Utility Model DE 201 17 873 U1, corresponding to U.S. Patent Application Publication No. US 2004/0013580 A1. That filter body, which is described as "open" in that document, is constructed by using a structured foil and a smooth filter layer. The foil has a plurality of vanes with a vane height, which in each case form a passage with a vane inlet and a vane outlet. The vane inlet and the vane outlet are disposed at an angle relative to one another. The particular feature of the filter body described therein is that the vane height amounts to between 100% and 60% of the structure height, with a freedom of flow of at least 20% being ensured. The reference to a freedom of flow indicates that it is not a closed filter concept, but rather a bypass flow is possible. With regard to the configuration of the vanes, it is also disclosed that they are advantageously to be provided on alternate sides and with the same orientation. Placement on alternate sides means that the vanes are positioned in adjacent structure extremes, projecting towards different sides of the foil. In that context, the term calling for the same orientation means that the passage openings of the vanes all face in the same axial direction of the filter body.

According to a refinement of that filter body, as described in International Application No. WO 2005/099867 A1, corresponding to U.S. Patent Application Publication No. US 2008/0159923 A1, the flow onto the vanes should advantageously take place through the obliquely positioned guide vane. That has effects, in particular, on a reduced pressure loss in the filter body as exhaust gases flow through in mobile internal combustion engines.

The filter bodies proposed in the above-mentioned document can already achieve considerable conversion rates while at the same time establishing a low pressure loss. Nevertheless, an increased efficiency of a bypass flow filter of that type is desirable, in particular with a view toward complying with future legislation. At the same time, the advantage of the lower pressure loss compared to closed systems is to be maintained.

SUMMARY OF THE INVENTION

It is accordingly an object of the invention to provide a bypass flow filter with improved filter efficiency and an exhaust system and a vehicle having the filter, which overcome the hereinafore-mentioned disadvantages or at least partially solve or minimize the technical problems of the heretofore-known filters, systems and vehicles of this general type. In particular, it is intended to provide a bypass flow filter which provides an improved efficiency with regard to the conversion of pollutants contained in an exhaust gas, with in particular the retention and if appropriate oxidation of particulates contained in the exhaust-gas stream being improved. At the same time, it is intended that the bypass flow filter should still be inexpensive to manufacture, and that the bypass flow filter should also withstand the high thermal and dynamic stresses encountered in the exhaust system of mobile internal combustion engines over a prolonged period of time.

With the foregoing and other objects in view there is provided, in accordance with the invention, a bypass flow filter, comprising at least one structured wall layer and a filter layer forming a plurality of channels. The at least one wall layer has projecting guide vanes and passages in at least a majority of the channels. The projecting guide vanes and passages lead to a different one of the channels. The passages have a narrowing cross section with a narrowing part directed towards an adjacent guide vane.

A bypass flow filter is to be understood, in particular, as meaning a filter body in which the treated gas stream is provided with the possibility of (theoretically) flowing along a path through it without passing through a filter layer. Therefore, the bypass flow filter pursues a different concept than the conventional "closed" filter, in which the channels are completely closed on one side, and therefore the entire exhaust gas stream must inevitably flow through a porous wall. The starting point in this case, by way of example, is the concept that the bypass flow filter fundamentally has separate channels, although these channels may be in communication with one another and/or exchange flow. In order to provide this configuration of a bypass flow filter, there are passages to adjacent channels. These passages are generally formed with the wall layer, which can be achieved on one hand through the use of perforations in the wall layer and/or also through the use of deformation of the wall layer.

The structured wall layer is advantageously made from a gas-impervious material, for example metal or ceramic, with a metallic wall layer being preferred. If this wall layer is made from a metal, it is preferably an at least partially corrugated metal foil. In the case of the filter layer, it is preferable to use a wire fabric (such as for example a fiber nonwoven or the like), which is advantageously made from the same material as, or under certain circumstances from a similar material to, the wall layer. In the case of a nonhelical structure of the filter body, it is usual for a plurality of wall layers and a plurality of filter layers to be disposed in such a way with respect to one another that together they in each case delimit a plurality of channels. These wall layers and filter layers are then wound or intertwined in such a way that bypass flow filters of any desired cross section can be placed in a corresponding housing.

Flow obstacles are formed within the channels by the provision of guide vanes, so that a dynamic pressure builds up in front of these guide vanes. This dynamic pressure leads to a considerable proportion of the gas stream which flows through the channel passing through a filter layer. This dynamic pressure is reduced if the gas stream has the possibility of escaping through a corresponding passage to a channel at a lower pressure level.

It has now been discovered that the configuration or orientation of the passage has a considerable effect in terms of the purification action. Therefore, according to the invention, it is now proposed that the passages have a narrowing cross section, with the narrowing part of the cross section directed towards the adjacent guide vanes. In other words, this means that the narrowing part of the cross section is formed towards the guide vane which builds up the dynamic pressure in the vicinity of the passage. Usually, the passages extend over a distance of several millimeters in the direction of the channels. In the configurations that have been disclosed heretofore, the largest cross section has always been directed towards the guide vane. This lead to an abrupt reduction in pressure, so that it was not possible to establish any significant accumulation of particulates in the region of the filter layer which covers the adjacent channel portion. Reversing the configuration of the passages, in such a manner that the cross section widens, has the effect that the filter layer in the region adjacent the guide vanes is also utilized. Initial tests have shown that this increases the efficiency by almost 10%. The result is more even loading of the filter layer and a further reduction in the likelihood of an exhaust-gas partial-stream passing through the bypass flow filter without having passed through the filter layer at all.

In accordance with another feature of the invention, in this context it is particularly advantageous for the narrowing cross section to have a surface area of from 0.8 mm$^2$ to 18 mm$^2$. It is very particularly preferred for the surface area to be in a range of from 1 mm$^2$ to 7 mm$^2$ for a channel width in a range of from 1 mm to 2.5 mm. This clearly demonstrates that this is a relatively large surface area, which in particular cannot become blocked by contamination and/or particulates during operation. This ensures that the bypass flow filter maintains its properties with regard to the low pressure loss in the long term even in the event of unfavourable operating conditions.

With the objects of the invention in view, there is also provided a bypass flow filter, comprising at least one structured wall layer and a filter layer forming a plurality of channels disposed next to one another. A plurality of guide vanes having a leading face are disposed in each respective one of at least a majority of the channels. The leading faces, of the guide vanes which are mutually offset in adjacent channels, have the same orientation.

This bypass flow filter is used, in particular, to form the above-described bypass flow filter with a narrowing part of the cross section of the passages. Therefore, at this point reference is made to the explanations given above with regard to the wall layer and the filter layer as well as the channels and the configuration of the guide vanes.

A further characteristic feature in this case is that the guide vanes have a leading face. The leading face is disposed inclined substantially towards the channel or towards its channel axis. It is now proposed at this point that these guide vanes, which are disposed directly offset with respect to one another, have the same orientation with regard to the leading faces. This is preferably to be understood as encompassing all the guide vanes of the bypass flow filter. In other words, this also means, for example, that the leading faces are disposed with substantially the same angle of inclination with respect to the main direction of flow of the exhaust gas. This does not necessarily require all the leading faces to have the same angle of inclination, but all the leading faces should be oriented in a corresponding way with respect to the main direction of flow. This also means that these guide vanes are generally disposed in such a way that the exhaust gas which flows in for one guide vane under consideration strikes the region of the leading face which projects furthest into the channel (vane end) and for the adjacent guide vane strikes a region close to the wall layer first of all (root end) or vice versa (in a so-called "alternating configuration"). This type of configuration of the guide vane with a leading face of the same orientation leads to the passages thus formed having a narrowing cross section, with the narrowing part of the cross section directed towards the adjacent guide vane. Therefore, with this specific configuration of the guide vanes, the positive effects described above in connection with maintaining the dynamic pressure ahead of a guide vane of this type are realized.

In accordance with a further advantageous feature of the invention, the passages are formed with guide vanes disposed in the adjacent channel and having a leading face, wherein the guide vanes that are offset with respect to one another are disposed in adjacent extremes of the wall layer. In other words, this means that (for example in the case of a regular corrugation structure of the wall layer) the guide vanes that are disposed offset with respect to one another are formed in a corrugation peak and an adjacent corrugation trough. In this case, these guide vanes advantageously extend in opposite directions, with the guide vanes disposed in the corrugation trough extending upwards and the guide vanes disposed in the corrugation peak extending downwards. Due to the indentation of the corrugated layer in this region or to form the guide vanes, the passages are formed with a narrowing part of the cross section. A configuration in which the guide vanes in the adjacent extremes are formed substantially symmetrically with respect to the respective channel is preferred in this context, although this is not imperative.

In accordance with an added feature of the bypass flow filter of the invention, in which the passages are formed with guide vanes that have a leading face, the leading faces are provided at an angle of up to 45° with respect to a channel axis. In this context, an angle of the leading face in a range of from 5° to 20° is particularly preferred in the case of a channel width of up to, for example, 2.5 mm. The angle relates, in particular, to the inclination of the leading face towards the direction of flow of the exhaust gas through the bypass flow filter.

In accordance with an additional feature of the invention, it is also proposed that in the case of a bypass flow filter with passages formed with guide vanes having a leading face, the leading faces are provided with a length of from 3 mm to 8 mm. It is very particularly preferable for the length of the leading faces to be in a range of from 4 mm to 6 mm.

In accordance with yet another feature of the invention, in this context it is clear that when selecting the angle and length of the leading faces of the guide vanes, the structure height and structure length of the wall layer should be taken into account. The starting point will generally be a corrugation height or channel width in a range of from 1 to 5 mm, in particular between 1 and 2.5 mm. When implementing the structure, it should accordingly be ensured that advantageously not all of the cross section of the channel is closed up by a guide vane of this type, although taking the shape of the guide vane into account, the latter may in fact extend over the entire height of the corrugation.

In accordance with yet a further feature of the bypass flow filter of the invention, in which the passages are formed with guide vanes having a leading face, the leading faces are provided with a height of from 50% to 100% of the respective channel width. The height is preferably in a range of from 70 to 100%.

In accordance with yet an added feature of the invention, in a bypass flow filter in which the passages are formed with guide vanes having a leading face, it is also advantageous for the adjacent guide vanes to be provided with an offset of at least 10 mm in the direction of the channel axis. This offset in this context substantially also characterizes the subregion in front of a guide vane of this type, in which the desired dynamic pressure is maintained, so that the largest possible proportion of the exhaust gas flowing along it passes through the filter layer. It is particularly preferable for the offset to be between 10 mm and 20 mm. If the offset is greater, only a reduced number of guide vanes can be accommodated in a channel of this type, which under certain circumstances can in turn lead to efficiency losses.

In accordance with yet an additional feature of the invention, it is proposed that at least 6 guide vanes be provided in a channel. A configuration with at least 10 or even 14 guide vanes per channel is very particularly preferred. As a result of a sufficiently large number of guide vanes being provided in a channel, it is possible to considerably increase the probability of the exhaust gas which flows past the filter layer being forced through the filter layer at the next possible opportunity.

In accordance with again another feature of the bypass flow filter of the invention, the structured wall layer is a metal foil, and the filter layer is a metallic fiber fabric. With regard to the metal foil, it should be noted that this foil preferably is formed of a corrosion-resistant material which is able to withstand high temperatures and in particular includes the alloying elements chromium and aluminum. The wire fabric advantageously includes a plurality of metallic fibers which have been conjoined to form a fabric (random or ordered), in particular have been welded together.

In accordance with again a further feature of the invention, it is also proposed that a plurality of layers including a wall layer and a filter layer be disposed and connected to one another in a housing. This is to be understood, in particular, as meaning an S-shaped configuration of the layers, including in each case one structured wall layer and one substantially smooth filter layer. Nevertheless, stacked (rectilinear) or helical configurations of the layers may also be appropriate, and consequently the specific configuration of the bypass flow filter is not intended to be subject to any restriction at this point. Nevertheless, by way of example, S-shaped or stacked configurations have the advantage that all the ends of the layers or of the wall layers and filter layers can be connected to the housing technical joining, for example brazing or welding. This ensures reliable cohesion between the individual layers and also between the layers and the housing.

In accordance with again an added feature of the bypass flow filter of the invention, at least a subregion of at least the wall layer or the filter layer has a catalytically active coating. A configuration in which both the wall layer and the filter layer are provided with a catalytically active coating in a partial volume of the bypass flow filter is particularly preferred in this context. The catalytically active coating preferably includes precious metal catalysts which are used, for example, to oxidize pollutant components contained in the exhaust gas. Examples of these precious metal catalysts include platinum, rhodium or palladium.

With the objects of the invention in view, there is furthermore provided a vehicle exhaust system, comprising a bypass flow filter according to the invention.

With the objects of the invention in view, there is concomitantly provided a vehicle, comprising a bypass flow filter according to the invention.

The aftertreatment of exhaust gases from mobile internal combustion engines is proposed as a particularly preferred application area for a bypass flow filter of this type.

Other features which are considered as characteristic for the invention are set forth in the appended claims, noting that the features listed individually in the claims can be combined with one another in any desired, technologically appropriate way so as to constitute further configurations of the invention.

Although the invention is illustrated and described herein as embodied in a bypass flow filter with improved filter efficiency and an exhaust system and a vehicle having the filter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
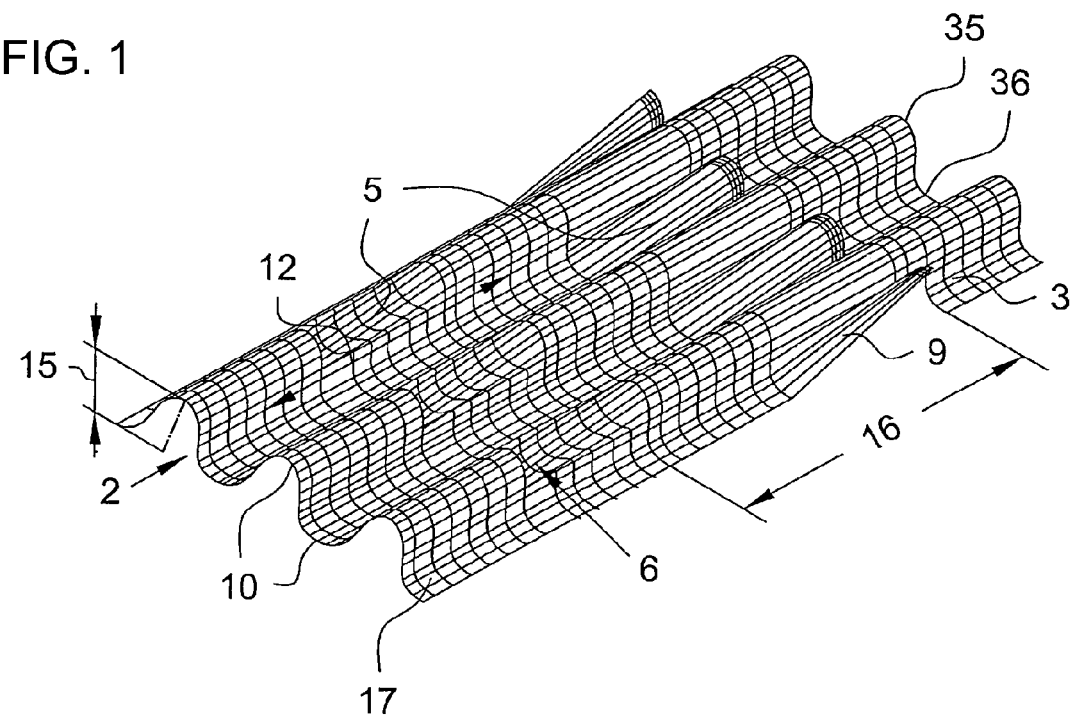
FIG. 1 is a diagrammatic, perspective view of a structured wall layer with guide vanes for forming passages.

Referring now to the figures of the drawings in detail and first, particularly, to FIG. 1 thereof, there is seen a diagrammatic and perspective illustration of a portion of a wall layer 3 which is formed with a metal foil 17. The metal foil 17 has a substantially regular corrugated shape with extremes 10 which are located adjacent one another and in this case are formed as a corrugation peak 35 and a corrugation trough 36. This corrugated structure or channels 2 are constructed with a channel width 15 of substantially the same size. The channels 2 are configured so as to be substantially parallel to one another and extend along a channel axis 12.

In the case of a simple corrugation structure, the exhaust gas would flow in laminar fashion along the channels 2. Therefore, to divert the exhaust gas passed through the channels 2, there is provision for a diversion to take place through the use of a plurality of guide vanes 5. In the case of the variant embodiment illustrated herein, the guide vanes 5 which are disposed in the corrugation peaks 35 are pressed downwards, while the guide vanes 5 which are disposed substantially in the corrugation troughs 36 are forced upwards. The shape of the guide vanes 5 is substantially distinguished by a leading face 9. A virtually partly-cylindrical portion may be provided, in the form of a collar, at the end of the leading face 9. Further details regarding the specific configuration of the guide vanes can be gathered from German Utility Model DE 201 17 873

U1, corresponding to U.S. Patent Application Publication No. US 2004/0013580 A1, which was cited in the introduction hereto. These guide vanes 5 block a considerable proportion of the cross section of the channel 2, resulting in diversion of the exhaust gas flowing through it. The guide vanes 5 produce a flow resistance, so that a corresponding dynamic pressure builds up in front of these guide vanes 5 or the leading faces 9. In order to ensure intensive flow diversion and therefore efficient purification of exhaust gases, it is advantageous for the guide vanes to be constructed with an offset 16 of from 10 mm to 20 mm.

It is of particular interest with regard to the configuration of the guide vanes 5 for the leading faces 9 of the guide vanes 5, that are disposed offset with respect to one another in adjacent channels 2, to have the same orientation. In other words, with regard to the illustration presented in FIG. 1, this means that the guide vanes 5 illustrated further to the left have a leading face 9 which is directed from the bottom left to the top right. The guide vanes 5 disposed offset with respect to the above-mentioned guide vanes, in the adjacent channels 2, have the same orientation, namely from the bottom left to the top right. If the guide vanes 5 that have been pressed downwards are considered, these guide vanes in each case form a passage 6 for the adjacent channels, with these passages 6 having a narrowing cross section. The result of the leading faces 9 of the guide vanes 5 being oriented in the same way is that the narrowing part of the cross section is oriented towards the adjacent guide vane 5. The effect of this configuration will now be illustrated with reference to FIG. 2.

Figure 2:
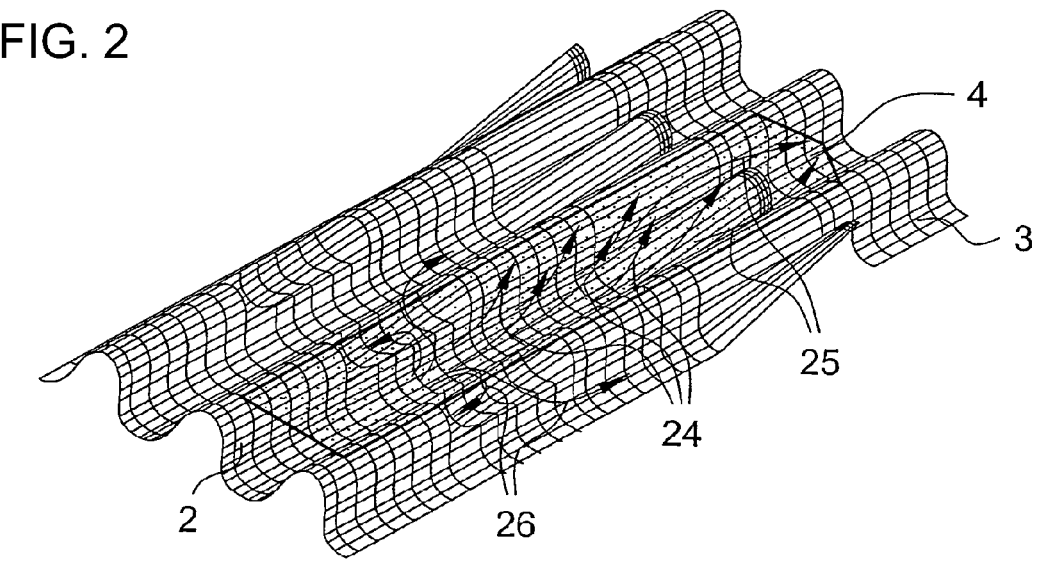
FIG. 2 is a perspective view of the wall layer illustrated in FIG. 1 together with a filter layer and various exhaust-gas partial-flows.

To this end, FIG. 2 shows the same configuration of the wall layer 3 as in FIG. 1. In addition, this figure illustrates a subregion of a filter layer 4, which substantially rests on the corrugation peaks of the wall layer 3. The flow conditions for a channel 2 are now illustrated by way of example through the use of corresponding arrows. The exhaust gas which flows into the channel 2 strikes the guide vane 5 which is located therein but constitutes a flow resistance. This leads to a dynamic pressure in an upstream channel region, with the result that a large proportion of the exhaust gas passes through the filter layer 4, as is illustrated through the use of arrows defining a filter flow 24. However, the bypass flow filter 1 does not just produce a filter flow 24, but also allows exhaust-gas partial-streams to flow past it, on one hand past the guide vane 5 itself, referred to as a bypass flow 25, but also by escaping from a channel 2 into an adjacent channel through the passages 6 (a so-called branch flow 26). Due to the configuration of the passage 6 described in accordance with the invention, or the identical orientation of the leading faces 9, it is possible to maintain the dynamic pressure over a larger region of the channel, while at the same time maintaining the distances or the offset with respect to the adjacent guide vanes. This leads to a surprisingly high increase in the efficiency of a bypass flow filter of this type.

Figure 3:
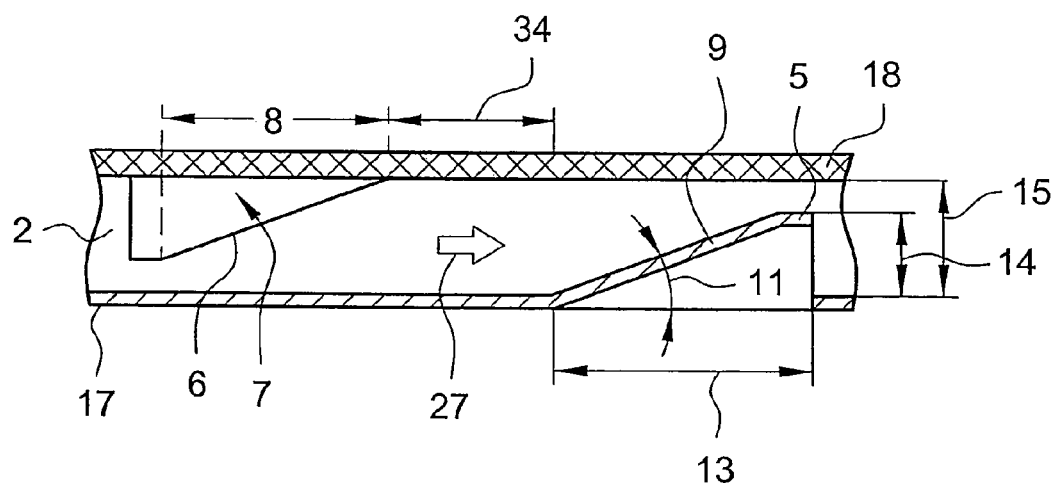
FIG. 3 is a fragmentary, longitudinal-sectional view of a further embodiment of the bypass flow filter.

FIG. 3 once again shows a further variant embodiment, based on a fragmentary view illustrated in section, of the bypass flow filter 1. The figure shows a channel 2 which is delimited by a structured metal foil 17 and a wire fabric 18. The metal foil 17 is illustrated with a guide vane 5 which has a leading face 9. The leading face 9 is preferably formed at an angle 11 in a range of advantageously from 5° to 25° with respect to the channel axis 12, and at the same time has a length 13 in a range of from 4 mm to 8 mm, so as to ultimately produce a height 15 which is in a range of from 70% to 100% of the channel width 15. As a result, the channel cross section is considerably narrowed, so that the exhaust gas, which otherwise flows in a direction of flow 27, is diverted. A passage 6 to an adjacent channel is now provided in the opposite direction to the direction of flow 27, i.e. upstream of the guide vane 5. This passage 6, which is formed, for example, with a corresponding guide vane in the corrugation peak, has a narrowing cross section 7, having a narrowing part 8 of the cross section 7 being directed towards the adjacent guide vane 5 which follows it in the direction of flow 27, illustrated on the right-hand side. The passage 6 and the corresponding guide vane 5 are advantageously spaced apart by a distance 34 of no more than 10 mm, preferably in a range of from 2 to 6 mm.

The narrowing part 8 of the passage 6, which is directed towards the guide vane 5, leads to the dynamic pressure which is built up in front of the guide vane 5 breaking down "slowly", so that a larger region of the wire fabric 18 can be used to filter the exhaust gas. This allows the efficiency of the bypass flow filter to be significantly increased.

Figure 4:
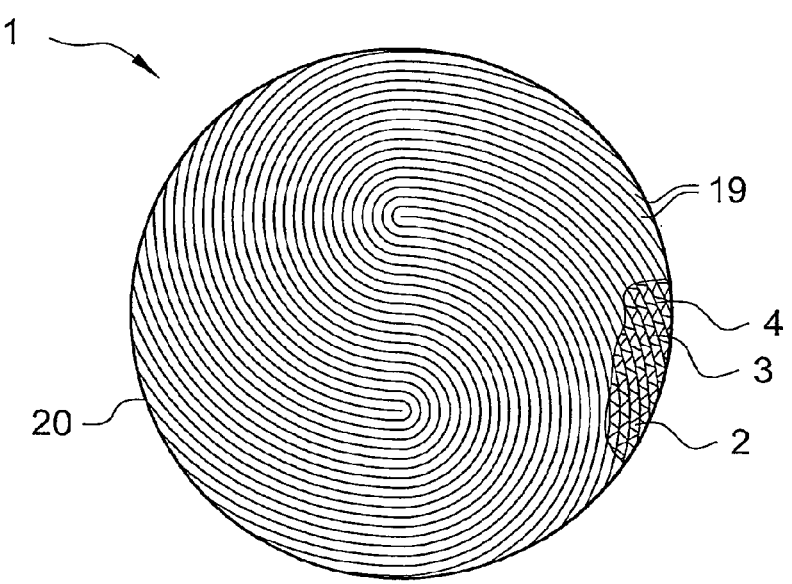
FIG. 4 is a partly-sectional, end-elevational view of a further variant embodiment of a bypass flow filter.

FIG. 4 diagrammatically shows an end-side view of a variant embodiment of a bypass flow filter 1. The latter includes a plurality of layers 19, which each include a wall layer 3 and a filter layer 4 for forming a plurality of channels 2. These layers 19 are at least partially wound together in a substantially S-shaped configuration and connected at their ends to a housing 20 by technical joining, in particular by brazing. Due to the layers 19 being secured at both ends, a particularly stable bypass flow filter 1 is produced, which is able to withstand even highly fluctuating thermal and dynamic stresses.

Figure 5:
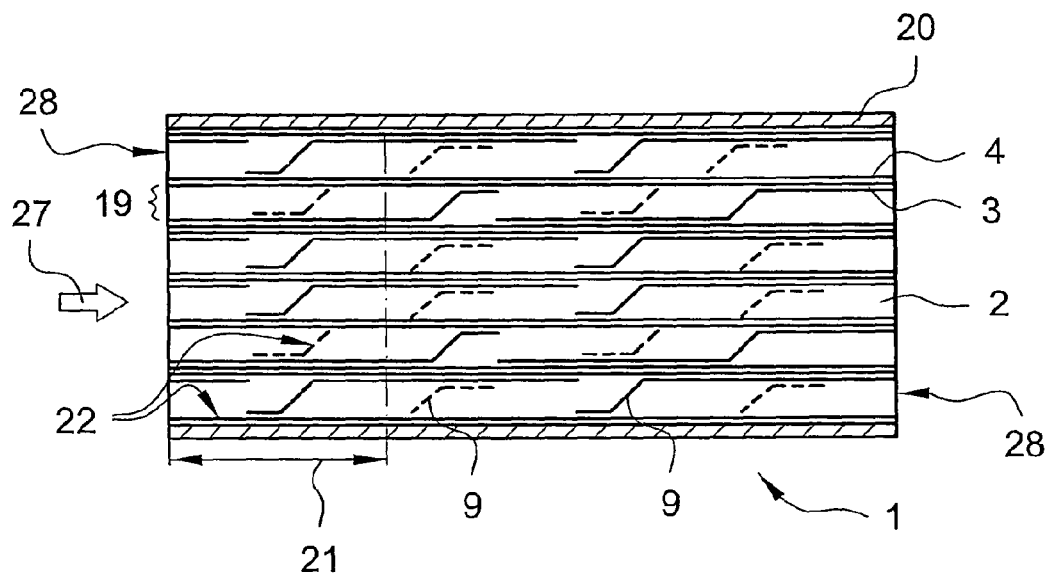
FIG. 5 is a longitudinal-sectional view of a further variant embodiment of the bypass flow filter according to the invention.

FIG. 5 illustrates a sectional view through a further embodiment of a bypass flow filter 1. The bypass flow filter 1, which includes a plurality of layers 19 made up of a wall layer 3 and a filter layer 4 for forming a multiplicity of channels 2, is once again disposed in a housing 20. The exhaust gas, which flows-in in the direction of flow 27, first of all strikes an end side 28 illustrated on the left-hand side, and is divided into numerous exhaust-gas partial-streams and passed through the channels 2. Due to the guide vanes 5 disposed in the channels 2, with the correspondingly oriented leading faces 9, the exhaust-gas partial-streams are deflected, so that they are forced through the filter layer 4, but without a channel 2 being completely closed up.

In the illustrated variant embodiment, the bypass flow filter 1 is constructed with a subregion 21 where the wall layers and the filter layers are provided with a catalytically active coating 22. It is particularly preferable for this coating 22 to include a precious metal catalyst, so that in this case the formation of nitrogen dioxide is promoted, for example in the manner of a continuous regeneration trap (CRT), and this formation of nitrogen dioxide, in the following subsection of the bypass flow filter 1, promotes conversion of trapped soot particulates into carbon dioxide even at low temperatures of approximately 600° C.

Figure 6:
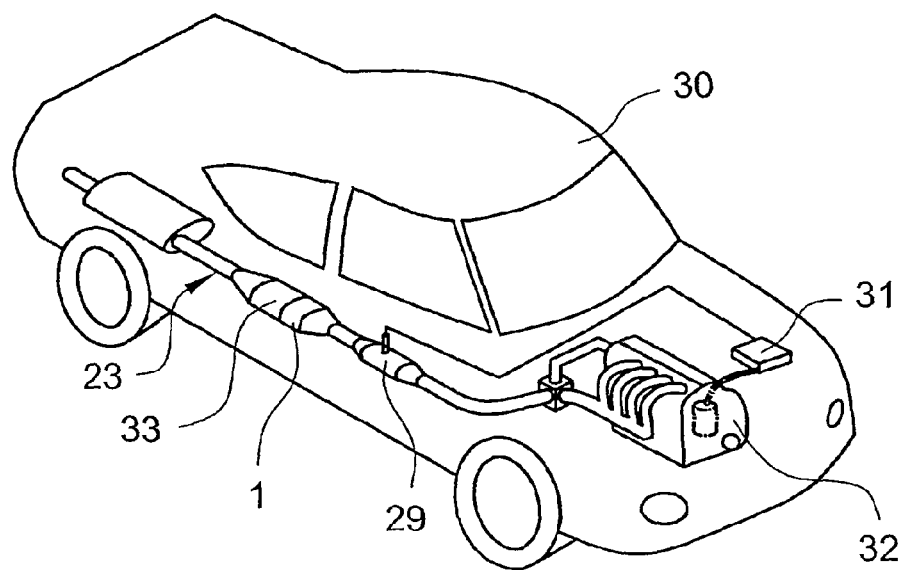
FIG. 6 is a perspective view of a motor vehicle with a bypass flow filter.

Finally, FIG. 6 shows a vehicle 30 which is constructed with a bypass flow filter 1 as described above. An internal combustion engine 32 (in particular a spark-ignition engine or a diesel engine) generates exhaust gas of different compositions as a function of an engine control 31, and this exhaust gas is passed through an exhaust system 23. In the example illustrated herein, the exhaust gas is first of all passed through an oxidation catalytic converter 29 for forming nitrogen dioxide before being passed into a downstream bypass flow filter 1, where the soot particulates are trapped and converted with the aid of the nitrogen dioxide that has previously been generated. The exhaust gas can then be fed to further exhaust-gas treatment units 33, so that further pollutant components in the exhaust gas are also converted, before finally being discharged to the atmosphere.

The configuration of the bypass flow filter proposed herein leads to a significant increase in efficiency.

The invention claimed is:

1. A bypass flow filter, comprising:
   at least one structured wall layer and a filter layer forming a plurality of channels disposed next to one another;
   a plurality of guide vanes for building up a dynamic pressure in an upstream cell region, said plurality of guide vanes having a leading face, defining passages in said wall layer, and being disposed in each respective one of at least a majority of said channels; and
   said passages being provided for allowing exhaust-gas partial streams to escape into an adjacent one of said channels and for allowing exhaust-gas partial-streams to bypass said filter layer in a direction of said adjacent channel;
   in adjacent channels connected to one another by said passages, said leading faces of said guide vanes having the same orientation and being mutually offset.

2. The bypass flow filter according to claim 1, wherein said guide vanes with said leading faces disposed in an adjacent channel form passages, said at least one wall layer has extremes, and mutually offset guide vanes are disposed in adjacent extremes of said at least one wall layer.

3. The bypass flow filter according to claim 1, wherein said guide vanes having said leading faces form passages, each of said channels has a channel axis, and said leading faces are each disposed at an angle of up to 45° relative to a respective channel axis.

4. The bypass flow filter according to claim 1, wherein said guide vanes having said leading faces form passages, and said leading faces have a length of from 3 mm to 8 mm.

5. The bypass flow filter according to claim 1, wherein said guide vanes having said leading faces form passages, said channels each have a channel width, and said leading faces each have a height of from 50% to 100% of a respective channel width.

6. The bypass flow filter according to claim 1, wherein said guide vanes having said leading faces form passages, each of said channels has a channel axis, and adjacent guide vanes have an offset of at least 10 mm in direction of a respective channel axis.

7. The bypass flow filter according to claim 1, wherein at least six of said guide vanes are disposed in each respective channel.

8. The bypass flow filter according to claim 1, wherein said structured wall layer is a metal foil, and said filter layer is a metallic wire fabric.

9. The bypass flow filter according to claim 1, which further comprises a housing, and a plurality of layers wound up together in said housing, said plurality of layers each including a wall layer and a filter layer.

10. The bypass flow filter according to claim 1, which further comprises a catalytically active coating disposed on at least a subregion of at least said wall layer or said filter layer.

11. A vehicle exhaust system, comprising a bypass flow filter according to claim 1.

12. A vehicle, comprising a bypass flow filter according to claim 1.

* * * * *